United States Patent
Kanderski et al.

(10) Patent No.: US 12,545,821 B2
(45) Date of Patent: *Feb. 10, 2026

(54) COMPOSTABLE HOT MELT ADHESIVE

(71) Applicant: Bostik, Inc., Wauwatosa, WI (US)

(72) Inventors: Monina D. Kanderski, Wauwatosa, WI (US); Michael D. Vitrano, Wauwatosa, WI (US); David P. Keuler, Wauwatosa, WI (US); Deepa Puthanparambil, Wauwatosa, WI (US); Jacqueline M. Lambert, Wauwatosa, WI (US); Brian J. Morrow, Wauwatosa, WI (US)

(73) Assignee: Bostik, Inc., Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,249

(22) Filed: Apr. 24, 2023

(65) Prior Publication Data

US 2023/0313004 A1 Oct. 5, 2023

Related U.S. Application Data

(63) Continuation of application No. 16/562,748, filed on Sep. 6, 2019, now Pat. No. 11,661,537.

(60) Provisional application No. 62/728,424, filed on Sep. 7, 2018.

(51) Int. Cl.
| | |
|---|---|
| *C09J 167/04* | (2006.01) |
| *B65D 6/00* | (2006.01) |
| *C08K 5/053* | (2006.01) |
| *C08K 5/092* | (2006.01) |
| *C08K 5/12* | (2006.01) |
| *C09J 5/06* | (2006.01) |
| *C09J 141/00* | (2006.01) |
| *C08K 5/00* | (2006.01) |

(52) U.S. Cl.
CPC ............ *C09J 167/04* (2013.01); *B65D 13/04* (2013.01); *C09J 5/06* (2013.01); *C09J 141/00* (2013.01); *C08K 5/0016* (2013.01); *C08K 5/053* (2013.01); *C08K 5/092* (2013.01); *C08K 5/12* (2013.01)

(58) Field of Classification Search
CPC .............................. C09D 167/04; C08L 67/04
See application file for complete search history.

(56) References Cited

U.S. PATENT DOCUMENTS

| | | | |
|---|---|---|---|
| 4,910,292 A | 3/1990 | Blount | |
| 4,973,656 A | 11/1990 | Blount | |
| 4,990,593 A | 2/1991 | Blount | |
| 5,252,646 A | 10/1993 | Iovine et al. | |
| 5,312,850 A | 5/1994 | Iovine et al. | |
| 5,574,076 A | 11/1996 | Sharak et al. | |
| 5,583,187 A | 12/1996 | Sharak et al. | |
| 5,700,344 A | 12/1997 | Edgington et al. | |
| 5,750,605 A | 5/1998 | Blumenthal et al. | |
| 5,753,724 A | 5/1998 | Edgington et al. | |
| 6,001,910 A | 12/1999 | Blumenthal | |
| 6,109,518 A | 8/2000 | Mueller et al. | |
| 6,365,680 B1 | 4/2002 | Edgington et al. | |
| 6,410,627 B1 | 6/2002 | Paul et al. | |
| 7,868,101 B2 | 1/2011 | Lewis et al. | |
| 7,910,645 B2 | 3/2011 | Ahmed et al. | |
| 8,067,492 B2 | 11/2011 | Robert | |
| 11,661,537 B2 * | 5/2023 | Kanderski | B65D 13/04 524/523 |
| 2010/0234228 A1 | 9/2010 | Lennon | A01N 57/20 504/206 |
| 2015/0299526 A1 | 10/2015 | Gray et al. | |

FOREIGN PATENT DOCUMENTS

| | | |
|---|---|---|
| CA | 1125681 A | 6/1982 |
| EP | 3214106 A1 | 9/2017 |
| WO | WO2012064478 A1 | 5/2012 |

OTHER PUBLICATIONS 1,4-Cyclohexanedimethanol Dibenzoate Technical Datasheet. Polymer Add Pte. Ltd. 2019. (Year: 2019).

* cited by examiner

*Primary Examiner* — Stephen E Rieth
(74) *Attorney, Agent, or Firm* — Christopher R. Lewis

(57) ABSTRACT

A hot melt adhesive comprises a polylactide homopolymer or copolymer, such as polylactic acid; sulfonated copolyester; and at least one plasticizer, and is compostable. The plasticizer may be a solid plasticizer, such as a benzoate, and a second plasticizer may also be used. The adhesive is suitable for use in a variety of applications, such as case and carton applications, use with burlap or other compostable substrates for tree bulbs or plant seeds, and use with other compostable films, and is especially appropriate for dual-walled paperboard beverage cups. The adhesive demonstrates good bond performance comparable to non-compostable adhesives over a range of temperatures, reflective of the temperatures of hot and cold beverages.

19 Claims, No Drawings

COMPOSTABLE HOT MELT ADHESIVE

CROSS-REFERENCE TO RELATED APPLICATION

This application is a continuation application under 35 U.S.C. § 120 claims of U.S. patent application Ser. No. 16/562,748, filed Sep. 6, 2019, which claims the benefit under 35 U.S.C. § 119(e) of U.S. Patent Application No. 62/728,424, filed Sep. 7, 2018.

FIELD OF THE INVENTION

This invention relates to a hot melt adhesive which can be composted and is especially adapted for use as an adhesive for paperboard beverage cups, for both hot and cold beverages.

BACKGROUND OF THE INVENTION

Hot melt adhesives are used for a wide variety of commercial applications. One advantage of hot melt adhesives is that these systems require no carrier fluid or solvent for application to a substrate and, as a consequence, the need for subsequent evaporation of solvent or carrier fluid is eliminated. The lack of a drying or evaporation step allows hot melt adhesive systems to eliminate the hazards associated with the use of solvents and the environmental impact of volatile organic compounds (VOCs). The use of hot melt adhesives also reduces water consumption by not requiring water as part of the adhesive. Hot melt adhesive formulations can be varied over a wide range of adhesive properties from pressure sensitive to non-pressure sensitive.

Hot melt adhesives have traditionally been based on petroleum based polymers. Thermoplastics have been used as the polymer component of hot melt adhesives, which generally fall into three types: (1) petroleum based polymers such as polyethylene, polypropylene, ethylene-vinyl acetate, styrene block copolymers (e.g. styrene isoprene styrene, styrene butadiene styrene); (2) polyurethanes; and (3) polyester/polycarbonate materials.

Many of these products have the disadvantage of poor environmental degradability. There is a strong need for packaging materials in which renewable resource materials like paper, starch, and certain degradable plastics (aliphatic polyesters, polylactides, etc.) are used. In the case of paper products, use of environmentally degradable adhesives would allow composting of the adhesive, when the paper, paperboard, or cardboard product is recycled. Or, alternatively, use of environmentally degradable adhesives would allow for composting of the entire assembled article, unlike articles sealed with typical petroleum-based hot melt formulations.

Certain adhesive applications have more demanding requirements than others, and an adhesive which is compostable and performs in a paperboard beverage cup must perform several functions. For an adhesive to be used to seal a paperboard beverage cup, it must be able to perform as an adhesive over a range of temperatures, given that the cup might contain a cold beverage, such as juice or soda, or a hot beverage, such as coffee or tea. For example, the adhesive must meet a performance requirements in which the cup is filled with hot water (e.g., about 180° F.-190° F.) and is torn, then the result must be a 100% fiber tear on all seals (both radial and end seals) of the adhesive. In other words, there must be no cohesive or adhesive failure; the cup must tear first. Moreover, this test must be passed both after initial (off-line) and under aged conditions (i.e., five days at 72° F.). In addition, the adhesive must be compostable, without compromising its bond performance. Furthermore, it would be desirable to allow the hot melt adhesive to run on existing hot melt adhesive application equipment, meaning that it must have similar flow characteristics, including viscosity, at the application temperature.

Hot melt adhesives have been used to bond together the outside wall of a disposable paper cup used to contain beverages such as coffee or tea and another substrate (e.g. paper/label), which serves as a secondary wall. To bond a cup to a label, it has been known to apply multiple radial beads of the hot melt adhesive around the outer periphery of the cup and a seam bead (or end seal) along the length of the cup where the edges of the label meet. There is no known compostable hot melt adhesive in the market today that has acceptable heat resistance to hot-beverages conditions, such as at 180° F.-190° F. There is also no known compostable hot melt adhesive in the market today with wide service temperatures e.g., (0° F.-160° F.).

U.S. Pat. No. 5,753,724 discloses a hot melt adhesive composition that is made using a polyester derived from lactic acid. A thermoplastic resin grade polyester is formulated into a functional adhesive using adhesive components. A lower molecular weight material can be used as a tackifying resin with a biodegradable/compostable resin in a formulated hot melt adhesive. The adhesive material can be made pressure sensitive and can be made entirely degradable by combining the polyester polymer with other biodegradable/compostable ingredients. The resulting adhesive composition can be used in a variety of applications. The biodegradable/compostable adhesive material can be used as a substitute for non-biodegradable materials made from commercial polymers that resist attack by bacteria, fungi, and other microbial populations. The hot melt adhesives can be used in packaging and in the manufacture of disposable articles which are made from degradable materials. The entire disposable article can be made from adhesives and structural materials that are fully compostable.

U.S. Pat. No. 7,868,101 discloses a method for preparing an environmentally degradable polymeric compound as well as to such a compound per se and to its use. A compound of the present invention includes a polycondensated lactic acid containing polymer, having a molecular weight (Mw) of from 500 to 50,000 g/mol, to which a flexibilizing aliphatic polyester having a molecular weight of from 500 to 50,000 g/mol is coupled. The amount of lactic acid including groups in the polymeric compound ranges from 50 to 99% and the amount of flexibilizing polyester groups ranges from 1 to 50%.

SUMMARY OF THE INVENTION

Embodiments of the present invention avoid many of the issues and constraints of the prior art. One embodiment of the invention is directed to a compostable hot melt adhesive suitable for use in a variety of applications, such as case and carton applications, and is especially appropriate for dual-walled paperboard cups. The hot melt adhesive composition of this embodiment comprises a polylactide homopolymer or copolymer; sulfonated copolyester; and a plasticizer, and is compostable. The polylactide homopolymer or copolymer may be selected from the group consisting of polylactic acid and copolymers of lactones, preferably glycolide and caprolactone. The plasticizer is preferably solid and may comprise a benzoate, preferably 1,4-cyclohexane dimethanol dibenzoate. The adhesive composition may comprise a second plasticizer, which may be selected from at least one of ethylene glycol, propylene glycol, and polyethylene glycol. The adhesive composition may also comprise an anti-oxidant, such as a hindered phenol. In an embodiment, the adhesive composition does not contain more than 5 wt %, more preferably no more than 4 wt %, and most preferably no more than 3 wt % of a constituent having a hydroxyl number greater than 100 mg KOH/g.

According to another embodiment of the invention, a method for forming a double-walled container comprises the steps of:

(a) applying the inventive hot melt adhesive composition described herein in a molten state to the outer surface of a first generally cylindrical paperboard substrate;

(b) mating a generally rectangular second paperboard substrate to the first paperboard substrate, wherein the second paperboard substrate is longer than the circumference of the first paperboard substrate, thereby providing an axial strip at which the ends of the second paperboard substrate overlap; and (c) applying the hot melt adhesive composition in a molten state to one of the mating surfaces of the axial strip; and (d) mating the mating surfaces of the axial strip to provide the double-walled container.

Another embodiment of the invention is directed to the container formed by the inventive method as described herein. In an aspect of this embodiment of the invention, the paperboard used for the container is compostable and the container is a beverage cup.

Embodiments of the invention provide a compostable hot melt adhesive with bond performance and heat resistance properties similar to traditional, non-compostable hot melt adhesives, such as those based on polyolefins, ethylene vinyl acetate, or styrene block copolymers. Adhesives according to the invention are useful in a variety of end applications, such as case and carton applications, use with compostable films, use with tree bulbs or plant seeds wrapped in burlap or other compostable substrates, and construction of various articles, such as the construction of dual-walled beverage cups. With respect to its use in the construction of compostable dual-walled beverage cups, the adhesive may be used bond together the outside wall of an inner substrate of a disposable paper cup and another, outer substrate (e.g., paper/label), which serves as a secondary wall. Also, the same adhesive may be used to both bond the inner substrate to the outer substrate and to bond together the outer substrate to itself at the end-seal area of the secondary wall.

Other features and advantages of the invention may be apparent to those of ordinary skill in the art upon reviewing the following description.

DETAILED DESCRIPTION OF THE INVENTION

According to an embodiment of the invention, a hot melt adhesive composition is compostable and comprises a polylactide homopolymer or copolymer; sulfonated copolyester; and a plasticizer.

The polylactide homopolymer or copolymer is selected from the group consisting of polylactic acid and copolymers of lactones, preferably glycolide and caprolactone. In a preferred embodiment, the polylactide homopolymer or copolymer comprises, consists essentially of, or consists of polylactic acid. In other embodiments, the polylactide homopolymer or copolymer has a melt index of at least 50 g/10 min, preferably at least 55 g/10 min, and most preferably at least 60 g/10 min at 210° C. using a 2.16 kg weight in accordance with ASTM Method D1238. At most, the polylactide homopolymer or copolymer has a melt index of 500 g/10 min, preferably at most 200 g/10 min, more preferably at most 150 g/10 min, and most preferably at most 100 g/10 min at 210° C. using a 2.16 kg weight in accordance with ASTM Method D1238.

In embodiments, polylactide homopolymer or copolymer comprises at least 20 mole percent of the lactide comonomer. The general structure of the polylactide is shown below:

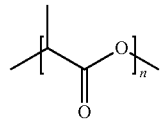

Suitable polylactide homopolymer or copolymer for use herein may have a number average molecular weight (Mn) within the range of 3,000 to 200,000 g/mol. (All molecular weights mentioned herein are measured by gel permeation chromatography (GPC) using polystyrene standards.) While poly(D,L-lactide) and the meso- are essentially amorphous, poly(L-lactide) and poly(D-lactide) is crystalline in nature and has a crystalline melting point of 186° C. depending on its molecular weight and stereopurity. The polymers may be prepared by ring-opening polymerization of the bimolecular cyclic ester of lactic acid with acid or base catalysts such as PbO, $SnCl_2$, $SnCl_4$, $ZnCl_2$, $SbF_5$, $Sb_2O_3$, or triethylamine using solution, precipitation, or melt processes. Alternatively, they may be obtained commercially from Henley Chemicals, Inc. under the Resomer® tradename; from Poly Sciences Inc., or from Ecological Chemical Products Company (EcoChem).

In addition to homopolymers of poly(L-lactide), poly(D-lactide), poly(D,L-lactide), and poly(meso-lactide) are suitable polylactide homopolymer or copolymer for use herein and may also be prepared by copolymerization with other lactones such as glycolide or caprolactone. Poly(D,L-lactide-co-glycolide) polymers containing equimolar amounts of the lactide and glycolide components are available from Henley chemicals as Resomer® RG502, 503, 504, 505 and 506 and are suitable for use herein. In addition, poly(D,L-lactide-co-glycolide) polymers known as Resomer® RG752, 755 and 756 containing 75% of the lactide component as well as the Resomer® 858 polymer which contains 85% lactide are also suitable.

In one embodiment, the polylactide homopolymer or copolymer is a thermoplastic resin derived from renewable resources. Preferably, the polylactide homopolymer or copolymer is amorphous and has a low melting point. In embodiments of the invention, the specific gravity of the polylactide homopolymer or copolymer is between about 1.1 and about 1.5, preferably between about 1.15 and about 1.4, and most preferably between about 1.2 and about 1.3, according to ASTM D792. In embodiments of the invention, the glass transition temperature of the polylactide homopolymer or copolymer is between about 40° C. and about 70° C., preferably between about 45° C. and about 65° C., and most preferably between about 50° C. and about 60° C., according to ASTM D3417. In embodiments of the invention, the melt index of the polylactide homopolymer or copolymer is at least about between about 50 g/10 min at 210° C. using a 2.16 kg weight, preferably at least about 55 g/10 min at 210° C. using a 2.16 kg weight, and most preferably at least about 60 g/10 min at 210° C. using a 2.16 kg weight and at most it has a melt index of at most about 500 g/10 min at 210° C. using a 2.16 kg weight, preferably at most about 200 g/10 min at 210° C. using a 2.16 kg weight, more preferably at most about 150 g/10 min at 210° C. using a 2.16 kg weight, and most preferably at most about 100 g/10 min at 210° C. using a 2.16 kg weight, all in accordance with ASTM Method D1238. In all cases herein, where multiple values are provided for a lower limit and multiple values are provided for an upper limit for any property or concentration range, the invention contemplates any range extending from and including any of the lower limits to and including any of the upper limits.

An exemplary polylactide homopolymer or copolymer is the Vercet line of resins, especially Vercet A1000, commercially available from Nature Works LLC. This is a thermoplastic resin derived from annually renewable resources, is available in pellet form, and is an amorphous, low-melting, high-flow resin.

The hot melt adhesive composition further comprises a sulfonated copolyester. In embodiments of the invention, the specific gravity of the sulfonated copolyester is between about 1 and about 1.5 g/cm$^3$, preferably between about 1.1 and about 1.3 g/cm$^3$, and most preferably between about 1.2 and about 1.3 g/cm$^3$, according to ASTM D792. In embodiments of the invention, the glass transition temperature of the sulfonated copolyester is between about 30° C. and about 70° C., preferably between about 35° C. and about 60° C., and most preferably between about 40° C. and about 50° C., according to a test using DSC in accordance with ASTM E1356-08 in which the inflection point is determined, namely the midpoint in the inflection (second order transition) during the second heat cycle. In embodiments of the invention, the intrinsic viscosity of the sulfonated copolyester is between about 0.15 dl/g and about 0.45 dl/g, preferably between about 0.2 dl/g and about 0.4 dl/g, and most preferably between about 0.25 dl/g and about 0.35 dl/g, according to ASTM D5225-14. In embodiments of the invention, the acid number of the sulfonated copolyester is either zero or at least about 0.01 mg KOH/g and preferably at least about 0.1 mg KOH/g, and at most about 10 mg KOH/g, preferably at most about 5 mg KOH/g, and most preferably at most about 3 mg KOH/g. In embodiments of the invention, the hydroxyl number of the sulfonated copolyester is either zero or at least about 0.01 mg KOH/g and preferably at least about 0.1 mg KOH/g, and at most about 15 mg KOH/g, preferably at most about 10 mg KOH/g, and most preferably at most about 5 mg KOH/g. In embodiments of the invention, the sulfonated copolyester has a weight average molecular weight of between about 20,000 g/mol to 80,000 g/mol, preferably between about 25,000 g/mol and 60,000 g/mol, and most preferably between about 28,000 g/mol and 42,000 g/mol. The viscosity of the polyester is preferably between 1000 cP and 100,000 cP at 350° F., most preferably between 5000 and 60,000 cP. Viscosity is measured in a Brookfield viscometer using a #27 spindle. Viscosity is generally related to molecular weight with higher viscosities corresponding to higher molecular weights.

According to embodiments of the invention, the sulfonated copolyester may be selected those described in U.S. Pat. No. 6,410,627, incorporated herein by reference. This patent describes a condensation polymer comprising the reaction product of:

a. at least one difunctional dicarboxylic acid or corresponding methyl ester which is not a sulphomonomer;

b. 2 to 25 mole percent of at least one sulphomonomer containing at least one metallic sulfonate group or nitrogen-containing non-metallic sulfonate group attached to an aromatic or cycloaliphatic nucleus and at least one functional group selected from the group consisting of hydroxyl, carboxyl, and amino;

c. at least one difunctional reactant selected from a glycol or a mixture of a glycol and diamine having two —NRH groups, the glycol containing two —C(R1)2-OH groups wherein R in the reactant is hydrogen or an alkyl group of 1 to 6 carbon atoms, and R1 in the reactant is a hydrogen atom, an alkyl of 1 to 5 carbon atoms, or an aryl group of 6 to 10 carbons atoms;

d. 0 to 40 mole percent of a difunctional reactant selected from hydroxycarboxylic acids having one —C(R)2-OH group, aminocarboxylic acids having one —NRH group, amino-alcohols having one —C(R)2-OH group and one —NRH group, or mixtures of said difunctional reactants wherein R in the reactant is hydrogen or an alkyl group of 1 to 6 carbon atoms; and e. 0 to 40 mole percent of a multifunctional reactant containing at least three functional groups selected from hydroxyl, carboxyl, and mixtures thereof wherein at least a portion of the multifunctional reactant contains at least three hydroxyl groups, wherein all stated mole percentages are based on the total of all acid, hydroxyl and amino group containing reactants being equal to 200 mole percent, and wherein the polymer contains proportions of acid-group containing reactants (100 mole percent acid) to hydroxy- and amino-group containing reactants (100 mole percent base) such that the value of (equivalents) EQ (base) divided by (equivalents) EQ (acid) is between 0.5 and 2. The polyester composition used as a component of the hot melt adhesives of the present invention preferably comprises 60 to 100 mole percent of (a), 4 to 20 mole percent of (b), 80 to 100 mole percent of (c), 0 to 10 mole percent of (d), and 0 to 20 mole percent of (e). In other more preferred embodiments of the invention the polyester comprises 60 to 100 mole percent of 1,4-cyclohexanedicarboxylic acid; 4 to 20 mole percent of 5-sodiosulfoisophthalic acid or dimethyl 5-sodiosulfoisophthalate; and 80 to 100 mole percent of diethylene glycol, neopentyl glycol or cyclohexanedimethanol.

According to embodiments of the invention, the sulfonated copolyester may be selected from those described in U.S. Pat. Nos. 4,910,292, 4,973,656 and 4,990,593, incorporated herein by reference. In still another embodiment of the invention, the sulfonated copolyester comprises Vitel® 1831044 copolyester polymer commercially available from Bostik, Inc. Hot melt adhesives based on sulfonated copolyesters are described in U.S. Pat. No. 5,750,605, incorporated herein by reference. Exemplary sulfonated copolyesters also include the Eastman AQ line of solid copolyesters commercially available from Eastman Chemical.

In embodiments of the invention, the sulfonated copolyester is water dispersible. Water dispersibility may be measured by the ability of the resin to disperse and remain as a homogeneous dispersion after mixing. This characteristic can be determined by combining the product with water under heat (e.g., 95° C.) and applying shear. The resin first softens on heating (i.e., it is clear and amorphous then becomes cloudy and soft when mixed with water). A product is said to be water dispersible if it does not settle or phase separate under the force of gravity once the mixing is completed.

The use of sulfonated copolyester confers the additional advantage of providing a degree of water sensitivity which is dependent on the ionic strength of the aqueous environment. Thus, adhesives can be formulated which are sufficiently resistant to the ionic environments encountered during use (such as the exposure to bodily fluids encountered in diapers and feminine napkins) yet still disperse and/or debond in tap water, which is of lower ionic strength. These adhesives are therefore particularly useful in constructing compostable articles.

The hot melt adhesive composition further comprises a plasticizer. Preferably, the plasticizer is a solid plasticizer, which are especially useful in embodiments requiring high heat resistance. The solid plasticizer may comprise a benzoate. The benzoate may be selected from the group consisting of glycerol tribenzoate, sucrose benzoate, pentaerythritol tetrabenzoate, and 1,4-cyclohexane dimethanol dibenzoate. Most preferably, the benzoate comprises, consists essentially of, or consists of 1,4-cyclohexane dimethanol dibenzoate, commercially available from under the trademark Benzoflex 352, commercially available from Eastman Chemical. One of the deficiencies of using polylactide homopolymer or copolymer is poor heat resistance properties. The incorporation of solid plasticizer into the formulation has been found to provide the heat resistance properties needed for use as an adhesive for disposable cups used for hot-beverages. Vegetable wax-based solid plasticizers may also be appropriate.

In one embodiment, the solid plasticizer has a melt point of between about 80° C. and about 160° C., preferably between about 90° C. and about 150° C., more preferably between about 100° C. and about 140° C., still more preferably between about 110° C. and about 130° C., and most preferably between about 110° C. and about 125° C., according to ASTM D7138 using DSC. In embodiments of the invention, the acid number of the solid plasticizer is either zero or at least about 0.001 mg KOH/g and preferably at least about 0.01 mg KOH/g, and at most about 3 mg KOH/g, preferably at most about 1 mg KOH/g, and most preferably at most about 0.2 mg KOH/g. In embodiments of the invention, the hydroxyl number of the sulfonated copolyester is either zero or at least about 0.01 mg KOH/g and preferably at least about 0.1 mg KOH/g, and at most about 10 mg KOH/g, preferably at most about 5 mg KOH/g, and most preferably at most about 3 mg KOH/g.

In embodiments of the invention, the adhesive further comprises a second plasticizer. The second plasticizer is selected from the group consisting of ethylene glycol, propylene glycol, and polyethylene glycol. Polyethylene Glycol having lower viscosities (such as PEG 400) serve to reduce the viscosity of the adhesive. In embodiments in which a solid plasticizer is used as the first plasticizer and the viscosity of the formulation is needed to be reduced, a liquid plasticizer is particularly advantageous. A range of polyethylene glycols can be used, depending on the desired viscosity of the formulation.

Other plasticizers suitable for use in the hot melt adhesive composition are described in U.S. Pat. No. 5,753,724, incorporated herein by reference. Plasticizers can improve the melt properties of the adhesives, can impart pressure sensitive properties, can extend the adhesive reducing cost, and can increase the flexibility and melt properties of the hot melt adhesive. The preferred plasticizers for use with the hot melt adhesives of the invention are biodegradable/compostable plasticizers. Such plasticizers typically comprise naturally recurring oils or synthetic materials manufactured containing ester or urea carbamyl or amido groups. Plasticizers typically have different molecular weight than the other constituents of the adhesive composition. When a solid plasticizer is used as the first plasticizer and the viscosity of the formulation is needed to be reduced, liquid plasticizers are used, such as materials having a molecular weight less than about 5,000 g/mol, preferably less than 1,000 g/mol, that can provide plasticizer properties to the compositions of the invention. Preferred classes of plasticizer materials for use in the invention comprise natural fats and oils compatible with the other constituents disclosed herein. A further preferred class of plasticizers for use in the adhesives of the invention include ester plasticizers typically made by reacting aromatic or aliphatic small molecule mono-, di- or triols with an aromatic or aliphatic acid compositions. Specific examples of additional plasticizers include castor oil, TegMer 809-PEG 400 di-2-ethylhexoate ester, Plasthall DBS-dibutyl sebacate, Plasthall DIBA diisobutyl sebacate, Santizer 160, which is a butyl benzyl phthalate, polycaprolactone diols having a molecular weight of about 500 g/mole and a melting point less than about 25° C., ethylene glycol dibenzoate, propylene glycol dibenzoate, diethylene glycol dibenzoate, and dipropylene glycol dibenzoate.

In embodiments of the invention, the adhesive further comprises a stabilizer or an anti-oxidant. The stabilizers/anti-oxidants which are useful in the hot melt adhesive compositions of the present invention are incorporated to help protect the other constituents noted above, and thereby the total adhesive system, from the effects of thermal and oxidative degradation which normally occur during the manufacture and application of the adhesive as well as in the ordinary exposure of the final product to the ambient environment. The anti-oxidant may comprise a hindered phenol. The hindered phenol may be selected from the group consisting of 1,3,5-trimethyl-2,4,6-tris(3,5-di-tert-butyl-4-hydroxybenzyl)benzene; pentaerythritol tetrakis-3-(3,5-di-tert-butyl-4-hydroxyphenyl) propionate; n-octadecyl 3,5-di-tert-butyl-4-hydroxyphenyl) propionate; 4,4'-methylenebis(2,6-di-tert-butylphenol); 4,4'-thiobis(6-tertbutyl-o-cresol); 2,6-di-tert-butylphenol; 6-(4-hydroxyphenoxy)-2,4-bis(n-octylthio)-1,3,5-triazine; di-n-octadecyl-3,5-di-tert-butyl-4-hydroxybenzylphosphonate; 2-(n-octylthio)-ethyl 3,5-di-tert-butyl-4-hydroxybenzoate; and sorbitol hexa [3-(3,5-di-tert-butyl-4-hydroxyphenyl) propionate]. The hot melt adhesive of the present invention may also include a stabilizer and/or an antioxidant in an effective amount, preferably in an amount of from about 0.1% to about 5% by weight. Preferably, from about 0.1% to 2% of a stabilizer or antioxidant is incorporated into the composition. Among the applicable stabilizers are hindered phenols and multifunction phenols, such as sulfur and phosphorous-containing phenols.

Polyolefin nucleating agents may also be also present in the adhesive of the invention. Nucleating agents suitable for this invention are generally of the sub class of nucleating agents known as clarifying agents that are commonly employed in polyolefin additive packages to promote rapid crystallization. Suitable materials include dibenzylidene sorbitol derivatives such as Millad 3988 and Millad NX8000 supplied by Milliken as well as Irgaclear D produced by BASF. Other suitable agents include aromatic amide systems such as NJ Star NU-100 provided by New Japan Chemical Company. If included, the nucleating agent is generally present in the adhesive compositions in amounts of about 0.05 to 5% by weight of the composition, preferably about 0.1 to 2.5% by weight are utilized, and most preferably about 0.2 to 1.0% by weight. Blends of two or more nucleating agent may also be used. For example, a blend of a nucleating agent and a second nucleating agent that is different than the first nucleating agent may also be employed. From about 0.05% to about 5% by weight of one or more additional nucleating agent may be blended together with the first nucleating agent if desired. The nucleating agent may be used directly as a powder, as a slurry in a portion of suitable plasticizing agent, or as a component in a masterbatch of suitable polymer masterbatch such as Milliken NX-10. Nucleation packages such as those described in US 2015/0299526 can also be included to tailor the set up rate and bonding properties of the hot-melt adhesive.

It should be understood that other optional additives may be incorporated into the adhesive composition of the present invention in order to modify particular physical properties. These may include, for example, such materials as ultraviolet light (UV) absorbers, waxes, surfactants, inert colorants, titanium dioxide, fluorescing agents and fillers. Typical fillers include talc, calcium carbonate, clay silica, mica, wollastonite, feldspar, aluminum silicate, alumina, hydrated alumina, glass microspheres, ceramic microspheres, thermoplastic microspheres, baryte and wood flour and may be included in an amount up to 40% by weight, and preferably between about 1 and 30% by weight.

The adhesive of the present invention is compostable. As used herein, the term "compostable" as applied to an adhesive is an adhesive which meets the requirements of either: (1) the Disintegration Testing as defined by ASTM D 6400-12 (using ISO 20200) (84 day compost exposure) or (2) the Aerobic Biodegradation as defined by ASTM D 6400-12 (using ASTM 5338-15) (at 58±2° C. at 141 days). In other words, the adhesive will reach a minimum of 90% weight loss within 84 days under the Disintegration Testing conditions or will have reached at least 90% carbon conversion (based on $CO_2$ production) within 141 days according to the Aerobic Biodegradation testing, described in more detail in the examples. In preferred embodiments, the adhesive meets the requirements of both: (1) the Disintegration Testing as defined by ASTM D 6400-12 (using ISO 20200) (84 day compost exposure) and (2) the Aerobic Biodegradation as defined by ASTM D 6400-12 (using ASTM 5338-15) (at 58±2° C. at 141 days).

The relative amounts of the various constituents have been found to be important for the adhesive to achieve the various properties needed for the desired application. This has been found to be especially true when the adhesive is to be used to seal the two walls together in a beverage cup, which requires heat resistance, resistance over a wide range of temperatures, and compostability. In an embodiment, the polylactic acid, the sulfonated copolyester and the plasticizer are present in amounts effective to achieve a bond performance of at least 80%, preferably at least 90%, and most preferably 100%. As used herein, "bond performance" refers to the performance of the adhesive when applied to uncoated paperboard and tested in the manner as follows: The corrugated flaps were cut into 1.5"×4" coupons. The adhesives were applied at 350° F. in a ⅜" bead with two seconds open time and two seconds compression. Bonds were allowed to set at room temperature overnight. Three bonds made with each adhesive were placed in a 0° F. freezer and a 160° F. oven for 24 hours. At that time, the bonds were tested immediately upon removal for percentage fiber tear. "Fiber tear" refers to areas of the substrate that were torn, as opposed to areas where the adhesive failed, either adhesively or cohesively. In preferred embodiments, the polylactic acid, the sulfonated copolyester and the solid plasticizer are present in amounts effective achieve the above-referenced bond performance at a temperature of about 175° F., most preferably over a range of temperatures from 0° F. to 175° F. In other embodiments, wherein the polylactic acid and the sulfonated copolyester are present in a weight ratio of between about 1:1 and about 9:5 by weight, preferably between about 6:5 and about 8:5 by weight, and most preferably between about 13:10 and about 3:2 by weight.

According to embodiments of the invention, the formulation includes the following constituents in approximately the following weight percentages:

the polylactic acid is present in an amount to function as a base polymer to provide cohesion for the adhesive and in embodiments is present in an amount of between about 25 and about 43% by weight, preferably between about 30 and about 38% by weight, and most preferably between about 31 and about 37% by weight;

the sulfonated copolyester is present in an amount effective to function as an adhesion promoter to porous substrates, such as paperboard or a label, and in embodiments is present in an amount of between about 15 and about 35% by weight, preferably between about 20 and about 30% by weight, and most preferably between about 22 and about 28% by weight;

the plasticizer is present in an amount effective to improve the heat resistance of the formulation to the desired level (e.g., to the bond performance referred to above at high temperatures), and in embodiments is present in an amount of between about 5 and about 60% by weight, preferably between about 15 and about 55% by weight, more preferably between about 20 and about 50% by weight, and most preferably between about 36 and about 42% by weight; and If used, a second plasticizer is present in an amount effective to reduce the viscosity of the adhesive to the desired values and in embodiments in present in an amount of between about 1 and 5% by weight, preferably between about 1.3 and about 3% by weight, and most preferably between about 1.5 and about 2% by weight.

If used, an anti-oxidant, such as a hindered phenol, is present in an amount effective to prevent oxidation or stabilize the adhesive and in embodiments is present in an amount of between about the anti-oxidant is present in an amount of between about 0.1 and about 1% by weight, preferably between about 0.25 and about 0.75% by weight, and most preferably between about 0.4 and about 0.6% by weight.

Preferably, the composition does not contain more than 5 wt %, more preferably no more than about 4 wt %, and most preferably no more than about 3 wt % of a constituent having a hydroxyl number greater than 100 mg KOH/g. Such a constituent could be, for example, styrene allyl copolymers, orthophthalate neopentyl glycol, polyester polyols, or combinations thereof, as disclosed in U.S. Pat. No. 6,410,627, incorporated herein by reference.

There is no particular order in making an adhesive composition of the present invention, and it may be made using conventional process steps. The adhesive may be made by mixing the various constituents and then heating just before application to a substrate.

The viscosity of the adhesive material according to the present invention should be generally at a viscosity at the application temperature appropriate to be processed and applied to its substrate as a hot melt adhesive. An adhesive with relatively low viscosity at a low application temperature is needed to be processed through standard hot melt adhesive equipment and to achieve the desired pattern and consequently suitable bonding performance at the application temperature. In general, the viscosity is equal to or less than about 50,000 cP at application temperature, preferably equal to or less than about 40,000 cP at application temperature, even more preferably less than about 35,000 cP at application temperature, still more preferably less than about 30,000 cP at application temperature according to ASTM D3236. All viscosities identified herein are measured according to this modified ASTM standard. Preferably, the viscosity of the composition is at least 1,000 cP, more preferably at least 5,000 cP, still more preferably at least about 7,500 cP and most preferably at least about 15,000 cP, at application temperature. Thus the viscosity could be between 1,000 cP and 35,000 cP and between 5,000 cP and 20,000 cP at 121° C. In other embodiments, the viscosity of the composition is between any of the ranges contemplated herein at various typically used application temperatures, the value of which depends on the particular application of the adhesive, between 121° C. at 180° C., such as at 121° C., 127° C., 135° C., 149° C. and 177° C. In an embodiment in which the adhesive is used to bond a double-walled cup for hot beverages, the viscosity of the adhesive at 177° C. is preferably between about 5,000 cP and about 50,000 cP, more preferably between about 15,000 cP and about 35,000 cP, and most preferably between about 20,000 cP and about 30,000 cP.

The end use application requirements are an important consideration in identifying the desired softening point of the adhesive formulation. For the application of using the adhesive to bond a double-walled cup for a hot beverage, the Ring and Ball softening point of the adhesive as determined by ASTM E28-99 may be between about 180° F. and about 300° F., more preferably between about 200° F. and about 280° F., and most preferably between about 220° F. and about 260° F.

The hot melt adhesive may be applied to the substrate(s) using a variety of coating techniques. Examples include hot melt slot die coating, hot melt wheel coating, hot melt roller coating, melt-blown coating as well as slot, spiral spray, and wrapping spray methods such as those used to affix elastic strands. Spray techniques are numerous and can be done with or without assistance of compressed air that would shape the adhesive spray pattern. The hot melt adhesive material is generally pumped molten through hoses to the final coating spot on the substrates.

In an embodiment of the invention, a method for forming a double-walled container comprises the steps of:
(a) applying the hot melt adhesive composition described herein in a molten state to the outer surface of a first generally cylindrical paperboard substrate;
(b) mating a generally rectangular second paperboard substrate to the first paperboard substrate, wherein the second paperboard substrate is longer than the circumference of the first paperboard substrate, thereby providing an axial strip at which the ends of the second paperboard substrate overlap; and
(c) applying the hot melt adhesive composition in a molten state to one of the mating surfaces of the axial strip; and
(d) mating the mating surfaces of the axial strip to provide the double-walled container.

In an embodiment of the invention, step (a) comprises applying the hot melt adhesive in a radial pattern. In other embodiments, steps (a) and (c) comprise applying the hot melt adhesive composition in the form of a bead. Preferably, the paperboard is compostable. Still more preferably, the paperboard used for the container is compostable and the container is a beverage cup. One such double-walled container is described in U.S. Pat. No. 6,109,518, incorporated herein by reference.

The compostable hot melt adhesive of the present invention may be used in a number of applications, especially ones in which the final article, including the adhesive, is desired to be compostable. As discussed above, embodiments of the adhesive of the present invention are especially appropriate for dual-walled paperboard beverage cups. Exemplary other applications involve case and carton applications, use with burlap or other compostable substrates for tree bulbs or plant seeds, and use with other compostable films. In each of these, the adhesive is applied to a first substrate in a molten state, a second substrate (or a portion of the first substrate) is then contacted with the adhesive, which is then allowed to cool and thereby bond the first substrate to the second substrate (or the other portion of the first substrate folded onto and mated with the first substrate). For example, in one embodiment, a tree bulb or plant seed may be wrapped in compostable burlap, adhesive may be applied to a mating area of the burlap, and the burlap is then folded over onto itself such that two mating surfaces of the burlap become bonded to one another upon cooling of the hot melt adhesive. In another embodiment, a first compostable film or substrate is contacted with the adhesive of the present invention, then a second compostable film is contacted with the adhesive, which is allowed to cool thereby bonding the two compostable films together to form a compostable laminate.

ASPECTS OF THE INVENTION

Aspect 1. A hot melt adhesive composition comprising:
(a) a polylactide homopolymer or copolymer;
(b) sulfonated copolyester; and
(c) a plasticizer,
wherein the adhesive is compostable.

Aspect 2. The composition of Aspect 1, wherein the polylactide homopolymer or copolymer is selected from the group consisting of polylactic acid and copolymers of lactones, preferably glycolide and caprolactone.

Aspect 3. The composition of Aspect 1, wherein the polylactide homopolymer or copolymer comprises, consists essentially of, or consists of polylactic acid.

Aspect 4. The composition of any of Aspects 1-3, wherein the polylactic acid, the sulfonated copolyester and the plasticizer are present in amounts effective to achieve a bond performance of at least 80%, preferably at least 90%, and most preferably 100%.

Aspect 5. The composition of Aspect 4, wherein the polylactic acid, the sulfonated copolyester and the solid plasticizer are present in amounts effective achieve the bond performance at a temperature of about 175° F., most preferably over a range of temperatures from 0° F. to 175° F.

Aspect 6. The composition of any of Aspects 1-5, wherein the polylactide homopolymer or copolymer and the sulfonated copolyester are present in a weight ratio of between about 1:1 and about 9:5 by weight, preferably between about 6:5 and about 8:5 by weight, and most preferably between about 13:10 and about 3:2 by weight.

Aspect 7. The composition of any of Aspects 1-6, wherein:

(a) the polylactide homopolymer or copolymer is present in an amount of between about 25 and about 43% by weight, preferably between about 30 and about 38% by weight, and most preferably between about 31 and about 37% by weight;

(b) the sulfonated copolyester is present in an amount of between about 15 and about 35% by weight, preferably between about 20 and about 30% by weight, and most preferably between about 22 and about 28% by weight; and (c) the plasticizer is present in an amount of between about 5 and about 60% by weight, preferably between about 15 and about 55% by weight, more preferably between about 20 and about 50% by weight, and most preferably between about 36 and about 42% by weight.

Aspect 8. The composition of any of Aspects 1-7, wherein the sulfonated copolyester is water-dispersible.

Aspect 9. The composition of any of Aspects 1-8, wherein the plasticizer comprises a solid plasticizer.

Aspect 10. The composition of Aspect 9, wherein the solid plasticizer comprises a benzoate.

Aspect 11. The composition of Aspect 10, wherein the benzoate is selected from the group consisting of glycerol tribenzoate, sucrose benzoate, pentaerythritol tetrabenzoate, and 1,4-cyclohexane dimethanol dibenzoate.

Aspect 12. The composition of Aspect 10, wherein the benzoate comprises, consists essentially of, or consists of 1,4-cyclohexane dimethanol dibenzoate.

Aspect 13. The composition of any of Aspects 1-12 further comprising a second plasticizer.

Aspect 14. The composition of Aspect 13, wherein the second plasticizer is selected from the group consisting of ethylene glycol, propylene glycol, and polyethylene glycol.

Aspect 15. The composition of Aspects 13 or 14, wherein the second plasticizer is present in an amount of between about 1 and 5% by weight, preferably between about 1.3 and about 3% by weight, and most preferably between about 1.5 and about 2% by weight.

Aspect 16. The composition of any of Aspects 1-15 further comprising an anti-oxidant.

Aspect 17. The composition of Aspect 16, wherein the anti-oxidant comprises, consists essentially of, or consists of a hindered phenol.

Aspect 18. The composition of Aspect 17, wherein the hindered phenol is selected from the group consisting of 1,3,5-trimethyl-2,4,6-tris(3,5-di-tert-butyl-4-hydroxybenzyl)benzene; pentaerythritol tetrakis-3-(3,5-di-tert-butyl-4-hydroxyphenyl) propionate; n-octadecyl 3,5-di-tert-butyl-4-hydroxyphenyl) propionate; 4,4'-methylenebis(2,6-di-tert-butylphenol); 4,4'-thiobis(6-tertbutyl-o-cresol); 2,6-di-tert-butylphenol; 6-(4-hydroxyphenoxy)-2,4-bis(n-octylthio)-1,3,5-triazine; di-n-octadecyl-3,5-di-tert-butyl-4-hydroxybenzylphosphonate; 2-(n-octylthio)-ethyl 3,5-di-tert-butyl-4-hydroxybenzoate; and sorbitol hexa [3-(3,5-di-tert-butyl-4-hydroxyphenyl) propionate].

Aspect 19. The composition of any of Aspects 16-18, wherein the anti-oxidant is present in an amount of between about 0.1 and about 1% by weight, preferably between about 0.25 and about 0.75% by weight, and most preferably between about 0.4 and about 0.6% by weight.

Aspect 20. The composition of any of Aspects 1-19, wherein the composition does not contain more than 5 wt %, more preferably 4 wt %, and most preferably 3 wt % of a constituent having a hydroxyl number greater than 100 mg KOH/g.

Aspect 21. The composition of any of Aspects 1-20, wherein the sulfonated copolyester has a weight average molecular weight of between about 20,000 g/mol to 80,000 g/mol, preferably between about 25,000 g/mol and 60,000 g/mol, and most preferably between about 28,000 g/mol and 42,000 g/mol.

Aspect 22. The composition of any of Aspects 1-21, wherein the polylactide homopolymer or copolymer has a melt index of at least 50, preferably at least 55, and most preferably at least 60 g/10 min at 210° C. using a 2.16 kg weight in accordance with ASTM Method D1238.

Aspect 23. The composition of any of Aspects 1-22, wherein adhesive meets the requirements of both: (1) the Disintegration Testing as defined by ASTM D 6400-12 (using ISO 20200) and (2) the Aerobic Biodegradation as defined by ASTM D 6400-12 (using ASTM 5338-15).

Aspect 24. The composition of any of Aspects 1-23, wherein the adhesive has a Ring and Ball softening point as determined by ASTM E28-99 of between about 180° F. and about 300° F., more preferably between about 200° F. and about 280° F., and most preferably between about 220° F. and about 260° F.

Aspect 25. A method for forming a double-walled container comprising the steps of:

(a) applying the hot melt adhesive composition of any of Aspects 1-24 in a molten state to the outer surface of a first generally cylindrical paperboard substrate;

(b) mating a generally rectangular second paperboard substrate to the first paperboard substrate, wherein the second paperboard substrate is longer than the circumference of the first paperboard substrate, thereby providing an axial strip at which the ends of the second paperboard substrate overlap; and (c) applying the hot melt adhesive composition in a molten state to one of the mating surfaces of the axial strip; and (d) mating the mating surfaces of the axial strip to provide the double-walled container.

Aspect 26. The method of Aspect 25, wherein step (a) comprises applying the hot melt adhesive in a radial pattern.

Aspect 27. The method of Aspects 25 or 26, wherein steps (a) and (c) comprise applying the hot melt adhesive composition in the form of a bead.

Aspect 28. The method of any of Aspects 25-27, wherein the paperboard is compostable.

Aspect 29. The container formed by the method of any of Aspects 25-28.

Aspect 30. The container of Aspect 29, wherein the paperboard used for the container is compostable and the container is a beverage cup.

Examples

The following examples demonstrate several aspects of certain preferred embodiments of the present invention, and are not to be construed as limitations thereof.

The feasibility of using adhesives according to the present invention for a double-walled beverage cup was investigated. In particular, three formulations were tested for bond performance according to the criteria described below.

The constituents of the adhesive, shown below in Table 1, were mixed at room temperature and then heated. The molten adhesive was heated to 350° F. and then applied in radial beads to the outer, uncoated paperboard wall of a cup. An outer wall of a commercially available paperboard cup was adhered to the inner wall by mating the outer wall to the adhesive just applied to the inner wall. Another radial bead was applied to one of the mating surfaces of the second wall at a portion of the second wall which overlapped itself, creating an axial strip. The second wall was then adhered to itself by mating the mating surfaces of the axial strip. The radial bead (adhesive around the inner wall of the cup) to creates a gap between the inner wall and outer wall to provide insulation. The adhesive was applied at 350° F. using conventional adhesive application equipment.

Adhesive bond strength was measured by peeling apart the end seals to check for 100% fiber tear (i.e., only the walls themselves tore, and the adhesive did not fail) and heat resistant performance was tested by pouring hot water in the cup immediately after application of the adhesive for 1 minute. The end seal must have no delamination from top to bottom seal to pass the test. Adhesive bond strength at 0° F. and boiling water conditions compared to the current traditional hot melt adhesives, shown in the control.

The constituents used, as identified in Table 1, were a polylactic acid sold under the trademark Vercet A1000 by Nature Works LLC ("PLA"); a sulfonated copolyester sold under the trademark Vitel®1831044 by Bostik, Inc. ("Sulfonated Copolyester); a solid plasticizer sold under the trademark Benzoflex 352 by Eastman Chemical ("Solid plasticizer"); a liquid plasticizer sold under the trademark Carbowax Sentry PEG 400 by Dow Chemical; and a conventional antioxidant ("AO"). Table 1 sets forth the weight (in grams) of the various constituents. As shown, Formulation 1 had about 30 wt % of the solid plasticizer. Formulation 1 did not pass the hot water test desired for this application. Formulation 2, which had more solid plasticizer than Formulation 1 but no liquid plasticizer, also in contrast to Formulation 1, had very good adhesion immediately off-line and passed hot water testing. However, after ten minutes at room temperature, the adhesive became brittle and adhesively failed both in radial and end seal applications. Formulation 3 passed the adhesive bond strength test both off line and aged (1 day, 5 days, and 2 months at various temperatures 0, 40, 72, 140, 160° F.).

In addition, Mix 3 surprisingly showed wider service temperature performance (0° F.-160° F.), and boiling water conditions (microwave for 3.0 minutes, around 210° F. water temperature). Although Formulations 1 and 2 did not meet the rigorous requirements of this application (i.e., for cups for hot beverages), these formulations may be appropriate for other applications requiring compostable adhesives.

TABLE 1

| Formulation | PLA | Sulfonated Co-polyester | Solid Plasticizer | Liquid Plasticizer | A0 | Total | Softening Point |
| --- | --- | --- | --- | --- | --- | --- | --- |
| 1 | 39.1 | 20.6 | 30.3 | 10.0 | 0.5 | 100.5 | 206 F |
| 2 | 40.0 | 20.0 | 40.0 | 0.0 | 0.5 | 100.5 | 246 F |
| 3 | 34.0 | 25.1 | 39.2 | 1.7 | 0.5 | 100.5 | 248 F |

An analysis was carried to determine whether the adhesive composition of Formulation 3 met requirements of the Disintegration Testing as defined by ASTM D 6400-12 (using ISO 20200). In particular, drawn down films of this adhesive with a maximum thickness of 31.5 mg were evaluated using ISO 20200 per ASTM D 6400-12 for up to eighty-four days at 58±2° C. The composting material of the test had a carbon-to-nitrogen ratio of 30:1, which is within the specifications for this test. The pH of the compost material at the start of testing was approximately 7.0 with a total dry solids content of 44.5% when dried at 105° C. until constant weight. The mature mushroom compost used in the test was purchased from Monterey Mushrooms in Princeton, Illinois and, as received, had a C: N ratio of 13:1. To meet this requirement, the sample being tested must reach a minimum of 90% weight loss within 84 days of testing. The adhesive sample tested was completely disintegrated (100% weight loss) after 84 days.

An analysis was carried to determine whether the adhesive composition of Formulation 3 met requirements of the Aerobic Biodegradation as defined by ASTM 5338-15. In particular, the ASTM D 6400-12 mineralization of an adhesive sample exposed to Aerobic Biodegradation using ASTM D-5338-15 mineralization at 58±2° C. (tier two level testing) through contact with compost medium was evaluated. The lab feedstock compost of the test had a C: N ratio of 29:1, which is within the specifications for this test. The pH of the compost material at the start of testing was approximately 7.0 with a total dry solids content of 50.0% when dried at 105° C. until constant weight. The mature mushroom compost used in the test was purchased from Monterey Mushrooms in Princeton, Illinois and, as received, had a C: N ratio of 14:1. To meet this requirement, the sample being tested must reach a minimum of 70% carbon conversion within forty-five (45) days per ASTM D 5338-15 Mineralization and 90% carbon conversion within one hundred forty-one (141) days per ASTM D 5338-15 Mineralization. The adhesive sample tested met both of these requirements, including reaching an average of 91.83% carbon conversion in 141 days.

Where a range of values is provided, it is understood that each intervening value, and any combination or sub-combination of intervening values, between the upper and lower limit of that range and any other stated or intervening value in that stated range, is encompassed within the range of values recited. In addition, the invention includes a range of a constituent which is the lower limit of a first range and an upper limit of a second range of that constituent.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. Nothing herein is to be construed as an admission that the invention is not entitled to antedate such disclosure by virtue or prior invention.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

We claim:
1. A hot melt adhesive composition comprising:
(a) a polylactide homopolymer or copolymer, wherein the polylactide homopolymer or copolymer comprises polylactic acid and is amorphous or essentially amorphous;

(b) sulfonated copolyester; and (c) a plasticizer, wherein the adhesive is compostable and the polylactic acid, the sulfonated copolyester and the plasticizer are present in amounts effective to achieve a bond performance of at least 80% at a temperature of about 175° F.

2. The composition of claim 1, wherein the polylactic acid, the sulfonated copolyester and the plasticizer are present in amounts effective to achieve a bond performance of at least 90% at a temperature of about 175° F.

3. The composition of claim 1, wherein the polylactic acid and the sulfonated copolyester are present in a weight ratio of between about 1:1 and about 9:5 by weight.

4. The composition of claim 1, wherein:

(a) the polylactic acid is present in the composition in an amount of between about 25 and about 43% by weight;

(b) the sulfonated copolyester is present in the composition in an amount of between about 15 and about 35% by weight; and (c) the plasticizer is present in the composition in an amount of between about 5 and about 60% by weight.

5. The composition of claim 1, wherein the sulfonated copolyester is water-dispersible.

6. The composition of claim 1 further comprising an anti-oxidant.

7. The composition of claim 6, wherein the anti-oxidant comprises a hindered phenol.

8. The composition of claim 7, wherein the hindered phenol is selected from the group consisting of 1,3,5-trimethyl-2,4,6-tris(3,5-di-tert-butyl-4-hydroxybenzyl)benzene; pentaerythritol tetrakis-3-(3,5-di-tert-butyl-4-hydroxyphenyl) propionate; n-octadecyl 3,5-di-tert-butyl-4-hydroxyphenyl) propionate; 4,4'-methylenebis(2,6-di-tert-butylphenol); 4,4'-thiobis(6-tertbutyl-o-cresol); 2,6-di-tert-butylphenol; 6-(4-hydroxyphenoxy)-2,4-bis(n-octylthio)-1,3,5-triazine; di-n-octadecyl-3,5-di-tert-butyl-4-hydroxybenzylphosphonate; 2-(n-octylthio)-ethyl 3,5-di-tert-butyl-4-hydroxybenzoate; and sorbitol hexa [3-(3,5-di-tert-butyl-4-hydroxyphenyl) propionate].

9. The composition of claim 1, wherein the composition does not contain more than 5 wt % of a constituent having a hydroxyl number greater than 100 mg KOH/g.

10. The composition of claim 1, wherein the sulfonated copolyester has a weight average molecular weight of between about 20,000 g/mol to 80,000 g/mol.

11. The composition of claim 1, wherein the polylactic acid has a melt index of at least 50 g/10 min at 210° C. using a 2.16 kg weight in accordance with ASTM Method D1238.

12. The composition of claim 1, wherein the adhesive meets the requirements of both: (1) the Disintegration Testing as defined by ASTM D 6400-12 (using ISO 20200) by reaching at least 90% weight loss within 84 days and (2) the Aerobic Biodegradation as defined by ASTM D 6400-12 (using ASTM 5338-15) by reaching at least 90% carbon conversion (based on $CO_2$ production) within 141 days.

13. The composition of claim 1, wherein the adhesive has a Ring and Ball softening point as determined by ASTM E28-99 of between about 180° F. and about 300° F.

14. A method for forming a double-walled container comprising the steps of:

(a) applying the hot melt adhesive composition of claim 1 in a molten state to the outer surface of a first generally cylindrical paperboard substrate;

(b) mating a generally rectangular second paperboard substrate to the first paperboard substrate, wherein the second paperboard substrate is longer than the circumference of the first paperboard substrate, thereby providing an axial strip at which the ends of the second paperboard substrate overlap; and (c) applying the hot melt adhesive composition in a molten state to one of the mating surfaces of the axial strip; and (d) mating the mating surfaces of the axial strip to provide the double-walled container.

15. The method of claim 14, wherein step (a) comprises applying the hot melt adhesive in a radial pattern.

16. The method of claim 14, wherein steps (a) and (c) comprise applying the hot melt adhesive composition in the form of a bead.

17. The method of claim 14, wherein the first paperboard substrate and the second paperboard substrate are is compostable.

18. The container formed by the method of claim 14.

19. The container of claim 18, wherein the first paperboard substrate and the second paperboard substrate used for the container is are compostable and the container is a beverage cup.

* * * * *